United States Patent
Ji et al.

(10) Patent No.: US 12,212,250 B2
(45) Date of Patent: Jan. 28, 2025

(54) CONTROL METHOD OF THREE-PHASE MULTI-LEVEL INVERTER AND INVERTER SYSTEM

(71) Applicant: Huawei Digital Power Technologies Co., Ltd., Shenzhen (CN)

(72) Inventors: Lin Ji, Shenzhen (CN); Kai Xin, Shanghai (CN); Haibin Guo, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 17/867,827

(22) Filed: Jul. 19, 2022

(65) Prior Publication Data

US 2023/0038257 A1    Feb. 9, 2023

(30) Foreign Application Priority Data

Jul. 21, 2021 (CN) .......................... 202110824562.8

(51) Int. Cl.
*H02M 7/487* (2007.01)
*H02M 1/15* (2006.01)
(Continued)

(52) U.S. Cl.
CPC .............. *H02M 7/487* (2013.01); *H02M 1/15* (2013.01); *H02M 7/5395* (2013.01);
(Continued)

(58) Field of Classification Search
CPC .............. H02M 1/0003; H02M 1/0009; H02M 1/0012; H02M 1/12; H02M 1/123;
(Continued)

(56) References Cited

U.S. PATENT DOCUMENTS 4,700,148 A    10/1987 Pauly
2012/0249043 A1 *  10/2012 Soares .............. H02M 7/53875
318/722
(Continued)

FOREIGN PATENT DOCUMENTS

CN    104065291 A    9/2014
CN    106787880 A    5/2017
(Continued)

OTHER PUBLICATIONS

Meng Jin et al., "DM and CM EMI Sources Modeling for Inverters Considering the PWM Strategies", Transactions of China Electrotechnical Society, vol. 22 No. 12, Dec. 2007, with an English abstract, 6 pages.

*Primary Examiner* — Thienvu V Tran
*Assistant Examiner* — Shahzeb K Ahmad
(74) *Attorney, Agent, or Firm* — Conley Rose, P.C.

(57) ABSTRACT

A control method of a three-phase multi-level inverter includes: determining a modulation ratio based on output of the three-phase multi-level inverter, where the modulation ratio indicates a ratio of an amplitude value of a sinusoidal modulation wave in pulse width modulation to an amplitude value of a carrier; generating, based on the modulation ratio and a modulation ratio threshold, a common-mode voltage regulation signal for regulating a common-mode voltage in phase voltages of the three-phase multi-level inverter; adding the common-mode voltage regulation signal and a differential-mode voltage regulation signal for regulating a differential-mode voltage in the phase voltages of the three-phase multi-level inverter to obtain a composite regulation signal, where the composite regulation signal is presented as a modulation wave for discontinuous pulse width modulation (DPWM); and generating, based on the composite
(Continued)

regulation signal, drive signals for controlling switches of phases of the three-phase multi-level inverter.

17 Claims, 11 Drawing Sheets

(51) Int. Cl.
*H02M 7/5395* (2006.01)
*H02M 7/797* (2006.01)
*H02M 1/12* (2006.01)
*H02M 7/527* (2006.01)

(52) U.S. Cl.
CPC ............ *H02M 7/797* (2013.01); *H02M 1/123* (2021.05); *H02M 7/527* (2013.01)

(58) Field of Classification Search
CPC ............ H02M 1/14; H02M 1/15; H02M 1/42; H02M 7/42; H02M 7/483; H02M 7/487; H02M 7/527; H02M 7/5395; H02M 7/797; Y02B 70/10; Y02E 10/56
See application file for complete search history.

(56) References Cited

U.S. PATENT DOCUMENTS

| | | | |
|---|---|---|---|
| 2016/0181945 A1* | 6/2016 | Ding | H02M 7/487 363/95 |
| 2019/0199235 A1* | 6/2019 | Liu | H02J 3/38 |
| 2019/0229646 A1* | 7/2019 | Liu | H02M 7/53873 |
| 2019/0280609 A1* | 9/2019 | Liu | H02P 27/08 |

FOREIGN PATENT DOCUMENTS

| | | |
|---|---|---|
| CN | 110912436 A | 3/2020 |
| CN | 111900891 A | 11/2020 |
| EP | 1763188 A1 | 3/2007 |
| EP | 2713498 A1 | 4/2014 |
| JP | 2011160529 A | 8/2011 |
| KR | 20200129980 A | 11/2020 |
| WO | 2014015667 A1 | 1/2014 |

* cited by examiner

CONTROL METHOD OF THREE-PHASE MULTI-LEVEL INVERTER AND INVERTER SYSTEM

CROSS-REFERENCE TO RELATED APPLICATION

This claims priority to Chinese Patent Application No. 202110824562.8 filed on Jul. 21, 2021, which is hereby incorporated by reference in its entirety.

TECHNICAL FIELD

This disclosure mainly relates to the power electronics field. Furthermore, this disclosure relates to a control method of a three-phase multi-level inverter and an inverter system.

BACKGROUND

A three-phase multi-level inverter can convert direct-current (DC) power to alternating-current (AC) power, and is widely applied in a power system. For example, a photovoltaic three-phase multi-level inverter may convert a direct current of a photovoltaic string to an alternating current, to input electric energy to a power grid system or an off-grid system.

Generally, a sinusoidal pulse-width modulation (SPWM) technology may be used to control a three-phase multi-level inverter, to obtain a high-quality sinusoidal alternating-current output voltage. The SPWM technology uses an impulse equivalence principle in a sampling control theory. To be specific, narrow pulse variables with different magnitudes and different waveforms have the same acting effect when being applied in an inertial system, provided that the variables have the same impulse or area (that is, an integral of a variable to time). Based on the SPWM technology, the three-phase inverter can output an expected alternating current through applying a high-frequency pulse drive signal with a changing pulse width to a semiconductor switch device in the inverter.

However, a high-frequency switch operation of the semiconductor switch device brings an excessively large switch loss. To reduce the loss, a discontinuous pulse-width modulation (DPWM) scheme further appears. In the DPWM modulation scheme, the switch loss is reduced because each phase of the three-phase multi-level inverter may not have a high-frequency switch operation in a time period. In comparison with the SPWM modulation scheme, although the foregoing advantages can be obtained through controlling the inverter by using the DPWM modulation scheme, a ripple current in a busbar capacitor on a direct-current side of the inverter is increased. To suppress the increased ripple current, a size of the busbar capacitor usually needs to be increased, or more busbar capacitors are used to share the ripple current, which leads to the increasing costs of the inverter.

SUMMARY

To resolve the foregoing problem, embodiments of this disclosure provide a new control solution of a three-phase multi-level inverter.

According to a first aspect of this disclosure, a control method of a three-phase multi-level inverter is provided. The method includes determining a modulation ratio based on output of the three-phase multi-level inverter, where the modulation ratio indicates a ratio of an amplitude value of a sinusoidal modulation wave in pulse-width modulation (PWM) to an amplitude value of a carrier, generating, based on the modulation ratio and a modulation ratio threshold, a common-mode voltage regulation signal for regulating a common-mode voltage in phase voltages of the three-phase multi-level inverter, adding the common-mode voltage regulation signal and a differential-mode voltage regulation signal for regulating a differential-mode voltage in the phase voltages of the three-phase multi-level inverter, to obtain a composite regulation signal, where the composite regulation signal is presented as a modulation wave for DPWM, and generating, based on the composite regulation signal, drive signals for controlling switches of phases of the three-phase multi-level inverter.

A ripple current in a busbar capacitor is not always increased due to the common-mode voltage regulation signal in DPWM modulation. When the modulation ratio exceeds a specific threshold, the common-mode voltage regulation signal is used to facilitate reduction of the ripple current in the busbar capacitor. In this embodiment of this disclosure, the common-mode voltage regulation signal may be adaptively regulated based on the modulation ratio and the modulation ratio threshold, so that the determined common-mode voltage regulation signal can be used to implement both reduction of a switch loss and suppression of a ripple current rather than simply remove or reduce the common-mode voltage regulation signal, thereby optimizing the DPWM modulation scheme.

In an implementation of the first aspect, the method further includes receiving a sensed value related to the three-phase multi-level inverter, and determining the modulation ratio threshold based on the sensed value. The modulation ratio threshold changes under different operating conditions and is affected by a plurality of electrical quantities. Therefore, a sensed electric quantity is received, and the modulation ratio threshold is determined in real time, to accurately determine critical points under different operating conditions, thereby implementing better control.

In an implementation of the first aspect, the sensed value includes a power factor of the three-phase multi-level inverter. Determining the modulation ratio threshold based on the sensed value includes determining the modulation ratio threshold based on the power factor. Because a strong correlation exists between the modulation ratio threshold and the power factor, the modulation ratio threshold can be relatively accurately determined based on the power factor.

In an implementation of the first aspect, generating, based on the modulation ratio and a modulation ratio threshold, a common-mode voltage regulation signal includes generating the common-mode voltage regulation signal in a first mode when the modulation ratio is not less than the modulation ratio threshold, or generating the common-mode voltage regulation signal in a second mode when the modulation ratio is less than the modulation ratio threshold, where a common-mode voltage in the second mode is reduced in at least a part of a time period in comparison with a common-mode voltage in the first mode. In this implementation, the common-mode voltage regulation signal may be adaptively regulated based on a comparison result of the modulation ratio and the modulation ratio threshold, to effectively suppress an increase of the ripple current in the busbar capacitor.

In an implementation of the first aspect, generating the common-mode voltage regulation signal in a second mode when the modulation ratio is less than the modulation ratio threshold includes generating the common-mode voltage regulation signal in a common-mode voltage reduction manner in a non-clamping time period in comparison with the first mode, where the non-clamping time period uses DPWM and has a switch operation. In this implementation, under an operating condition of a small modulation ratio, only the common-mode voltage regulation signal in the non-clamping time period is suppressed. Therefore, the ripple current in the busbar capacitor can be suppressed to a sufficiently low level without increasing the switch loss of the inverter.

In an implementation of the first aspect, generating the common-mode voltage regulation signal in a common-mode voltage reduction manner in a non-clamping time period in comparison with the first mode includes generating the common-mode voltage regulation signal for setting a common-mode voltage to zero in the non-clamping time period. In this implementation, the ripple current caused due to the common-mode voltage regulation signal can be avoided to a greatest extent without a need of reducing a clamping time period.

In an implementation of the first aspect, generating the common-mode voltage regulation signal in a common-mode voltage reduction manner in a non-clamping time period in comparison with the first mode includes generating the common-mode voltage regulation signal for setting a common-mode voltage to a graded step voltage in the non-clamping time period, where the graded step voltage gradually changes from a first voltage value to zero and gradually changes from zero to a second voltage value with time, and the first voltage value is different from the second voltage value. In this implementation, slowly change processing may be implemented for suppression of the common-mode voltage regulation signal in the non-clamping time period, to eliminate signal stepping and avoid possible common-mode oscillation.

According to a second aspect of this disclosure, an inverter system is provided. The inverter system includes a three-phase multi-level inverter and a control apparatus for controlling the three-phase multi-level inverter. The control apparatus is configured to determine a modulation ratio based on output of the three-phase multi-level inverter, where the modulation ratio indicates a ratio of an amplitude value of a sinusoidal modulation wave in PWM to an amplitude value of a carrier, generate, based on the modulation ratio and a modulation ratio threshold, a common-mode voltage regulation signal for regulating a common-mode voltage in phase voltages of the three-phase multi-level inverter, add the common-mode voltage regulation signal and a differential-mode voltage regulation signal for regulating a differential-mode voltage in the phase voltages of the three-phase multi-level inverter, to obtain a composite regulation signal, where the composite regulation signal is presented as a modulation wave for DPWM, and generate, based on the composite regulation signal, drive signals for controlling switches of three phases of the three-phase multi-level inverter.

In an implementation of the second aspect, the control apparatus is further configured to receive a sensed value related to the three-phase multi-level inverter, and determine the modulation ratio threshold based on the sensed value.

In an implementation of the second aspect, the sensed value includes a power factor of the three-phase multi-level inverter. Determining the modulation ratio threshold based on the sensed value includes determining the modulation ratio threshold based on the power factor.

In an implementation of the second aspect, generating, based on the modulation ratio and a modulation ratio threshold, a common-mode voltage regulation signal includes generating the common-mode voltage regulation signal in a first mode when the modulation ratio is not less than the modulation ratio threshold, or generating the common-mode voltage regulation signal in a second mode when the modulation ratio is less than the modulation ratio threshold, where a common-mode voltage in the second mode is reduced in at least a part of a time period in comparison with a common-mode voltage in the first mode.

In an implementation of the second aspect, generating the common-mode voltage regulation signal in a second mode when the modulation ratio is less than the modulation ratio threshold includes generating the common-mode voltage regulation signal in a common-mode voltage reduction manner in a non-clamping time period in comparison with the first mode, where the non-clamping time period uses DPWM and has a switch operation.

In an implementation of the second aspect, generating the common-mode voltage regulation signal in a common-mode voltage reduction manner in a non-clamping time period in comparison with the first mode includes generating the common-mode voltage regulation signal for setting a common-mode voltage to zero in the non-clamping time period.

In an implementation of the second aspect, generating the common-mode voltage regulation signal in a common-mode voltage reduction manner in a non-clamping time period in comparison with the first mode includes generating the common-mode voltage regulation signal for setting a common-mode voltage to a graded step voltage in the non-clamping time period, where the graded step voltage gradually changes from a first voltage value to zero and gradually changes from zero to a second voltage value with time, and the first voltage value is different from the second voltage value.

It may be understood that the inverter system provided in the second aspect is configured to implement the method provided in the first aspect. Therefore, explanation or description of the first aspect is also applicable to the second aspect. Therefore, for beneficial effects that can be achieved in the second aspect, refer to beneficial effects in the corresponding method. Details are not described herein again.

These aspects and other aspects of the present disclosure are simpler and easier to understand in descriptions of (a plurality of) embodiments below.

BRIEF DESCRIPTION OF DRAWINGS

With reference to the accompanying drawings and the following detailed descriptions, the foregoing and other features, advantages, and aspects of embodiments of this disclosure become more apparent. In the accompanying drawings, the same or similar reference numerals indicate the same or similar elements.

DESCRIPTION OF EMBODIMENTS

The following describes embodiments of this disclosure in detail with reference to the accompanying drawings. Although some embodiments of this disclosure are shown in the accompanying drawings, it should be understood that this disclosure may be implemented in various forms, and should not be construed as limitation on the embodiments described herein. Instead, these embodiments are provided for a more thorough and complete understanding of this disclosure. It should be understood that the accompanying drawings and embodiments of this disclosure are merely used as examples and are not intended to limit a protection scope of this disclosure.

In the descriptions of embodiments of this disclosure, the term "including" and similar terms thereof shall be understood as open inclusion, that is, "including but not limited to". The term "based on" should be understood as "at least partially based on". The term "one embodiment" or "this embodiment" should be understood as "at least one embodiment". The terms "first", "second", and the like may indicate different objects or the same object. The following may further include other explicit and implied definitions.

Figure 1:
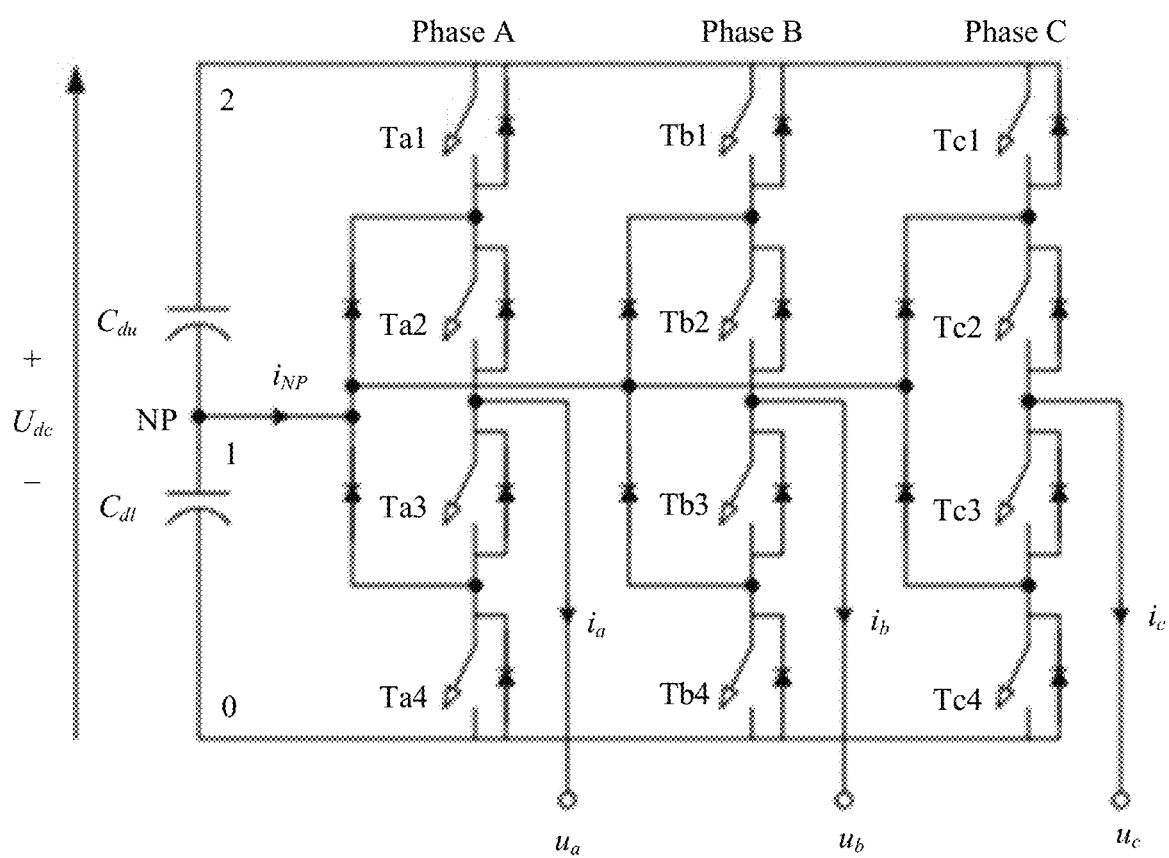
FIG. 1 is a schematic diagram of a circuit of a conventional three-phase three-level inverter.

FIG. 1 is a schematic diagram of a circuit of a conventional three-phase three-level inverter. The three-phase three-level inverter in FIG. 1 may include three phase branches, that is, a phase A, a phase B, and a phase C. The phase A branch includes switch devices: Ta1, Ta2, Ta3, and Ta4. The phase B branch includes switch devices: Tb1, Tb2, Tb3, and Tb4. The phase C branch includes switch devices: Tc1, Tc2, Tc3, and Tc4. Middle points (that is, a node between Ta2 and Ta3, a node between Tb2 and Tb3, and a node between Tc2 and Tc3) of the phase A branch, the phase B branch, and the phase C branch respectively output corresponding phase voltages: $u_a$, $u_b$, and $u_c$. In order that the three-level inverter can output three levels of phase voltages, a node between the switch devices: Ta1 and Ta2 of the phase A branch and a node between the switch devices: Ta3 and Ta4 of the phase A branch are separately connected to a node between busbar capacitors: $C_{du}$ and $C_{dl}$ by using a diode. The phase B branch and the phase C branch also have a connection structure similar to the phase A branch. As described above, to control the inverter in FIG. 1 to output expected alternating-current power, an SPWM technology may be used to control the inverter.

Figure 2:
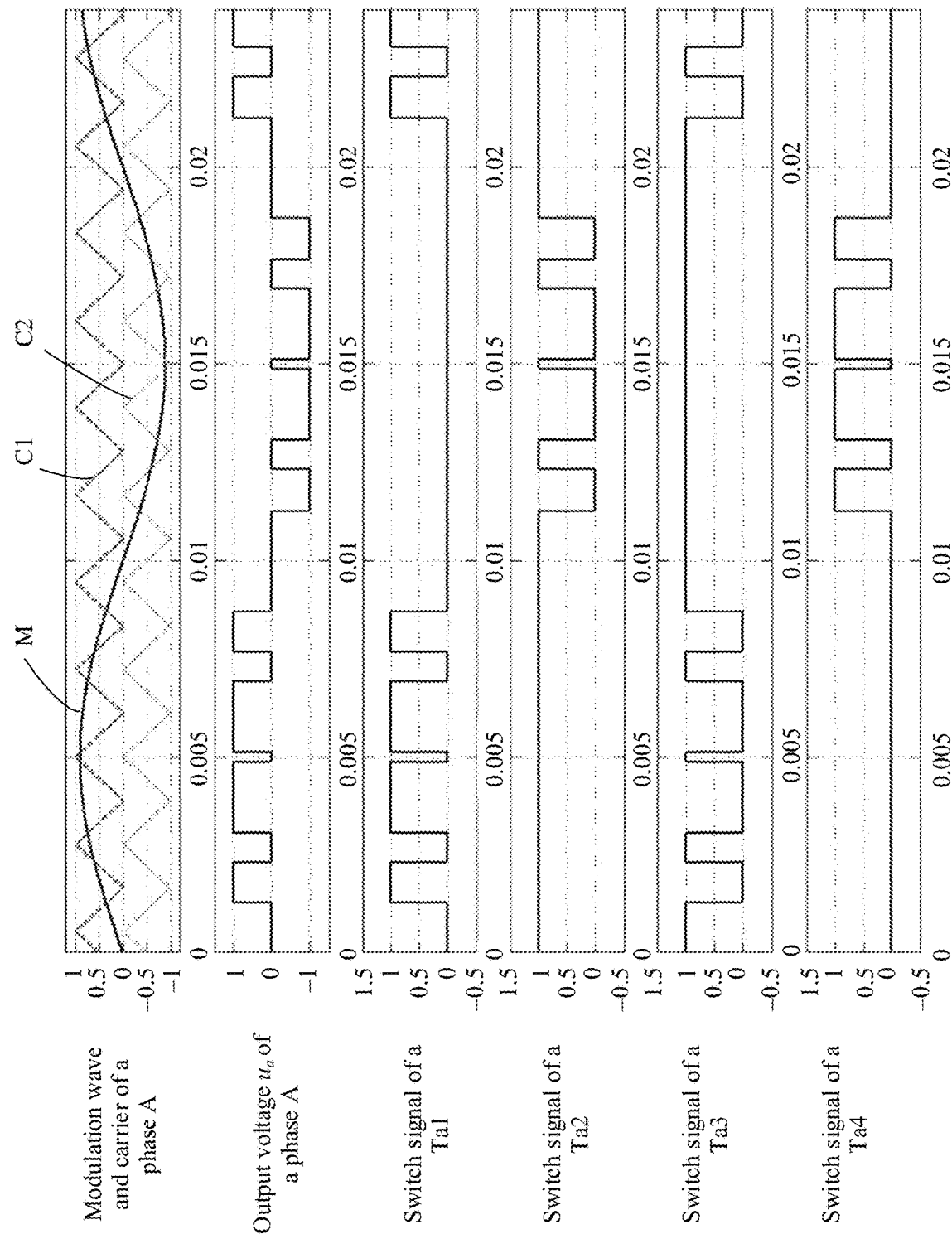
FIG. 2 is a schematic diagram of a signal waveform and an output waveform of a three-phase three-level inverter in SPWM modulation.

FIG. 2 is a schematic diagram of a signal waveform and an output waveform of a three-phase three-level inverter in an SPWM modulation scheme. For brevity and clarity, FIG. 2 shows only examples of various signals and output waveforms related to the phase A branch. It may be understood that the phase B branch and the phase C branch have similar signals and similar output waveforms. Switch signals of the four switch devices: Ta1, Ta2, Ta3, and Ta4 of the A phase branch are all generated based on comparison between a modulation wave and a carrier. In this specification, values of the modulation wave and the carrier may be both normalized standard values. When a modulation wave M in a sinusoidal form is greater than an upper triangular carrier C1, a gate of the phase switch device Ta1 receives a high-level on signal as a switch signal. When the modulation wave is less than the upper triangular carrier, the gate of the phase switch device Ta1 receives a low-level off signal as a switch signal. When the modulation wave is greater than a lower triangular carrier C1, a gate of the phase switch device Ta2 receives a high-level on signal as a switch signal. When the modulation wave is less than the lower triangular carrier, the gate of the phase switch device Ta2 receives a low-level on signal as a switch signal. A switch signal of the switch device Ta3 is complementary to the switch signal of the switch device Ta1. A switch signal of the switch device Ta4 is complementary to the switch signal of the switch device Ta2. Therefore, the output voltage $u_a$ shown in a second waveform diagram in FIG. 2 may be obtained at an output node of the A phase branch. The filtered output voltage has a waveform similar to a sinusoidal wave. The phase B branch and the phase C branch also have similar switch signals and output. For the B phase branch and the C phase branch, phase shift only needs to be respectively performed on the modulation waves by 120 degrees (°) and 240°. Switch signals and output voltages are correspondingly obtained through comparing the carriers with the modulation waves obtained after the phase shift.

As described above, in the SPWM modulation scheme, the switch device in each phase branch of the inverter needs to perform a switch operation in almost every switch cycle. Therefore, a relatively large switch loss may exist when a high-frequency switch operation is performed. In this specification, the switch cycle and a carrier cycle have the same meaning, and may be used alternatively.

Figure 3A:
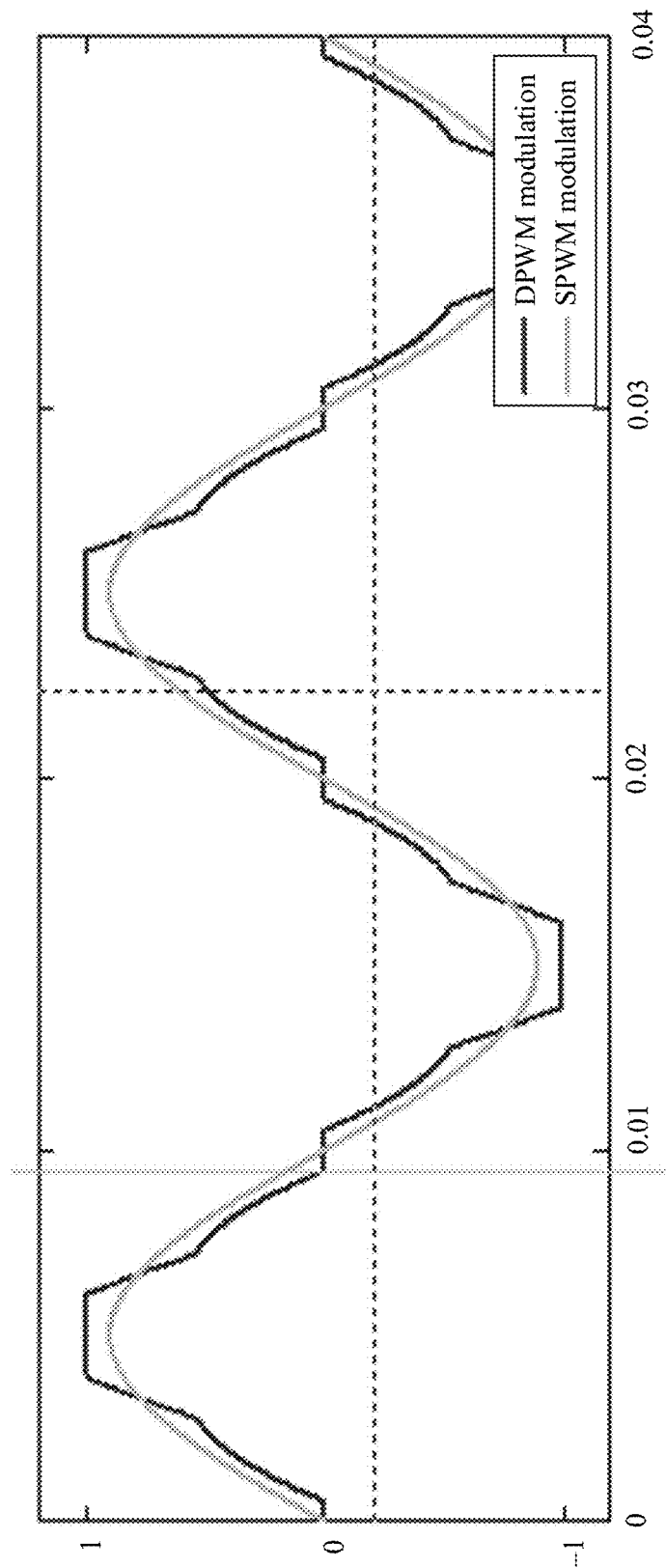
FIG. 3A is a schematic diagram of comparison between a waveform of a modulation wave in conventional DPWM and a waveform of a modulation wave in SPWM.
Figure 3B:
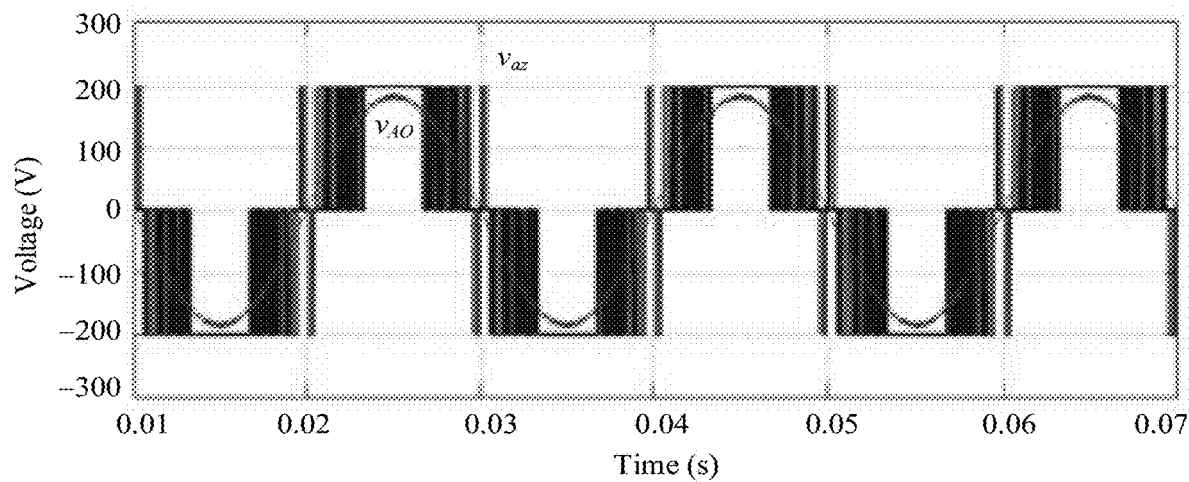
FIG. 3B is a schematic diagram of an example output voltage and a filtered output voltage of a three-phase three-level inverter in DPWM modulation.
Figure 3C:
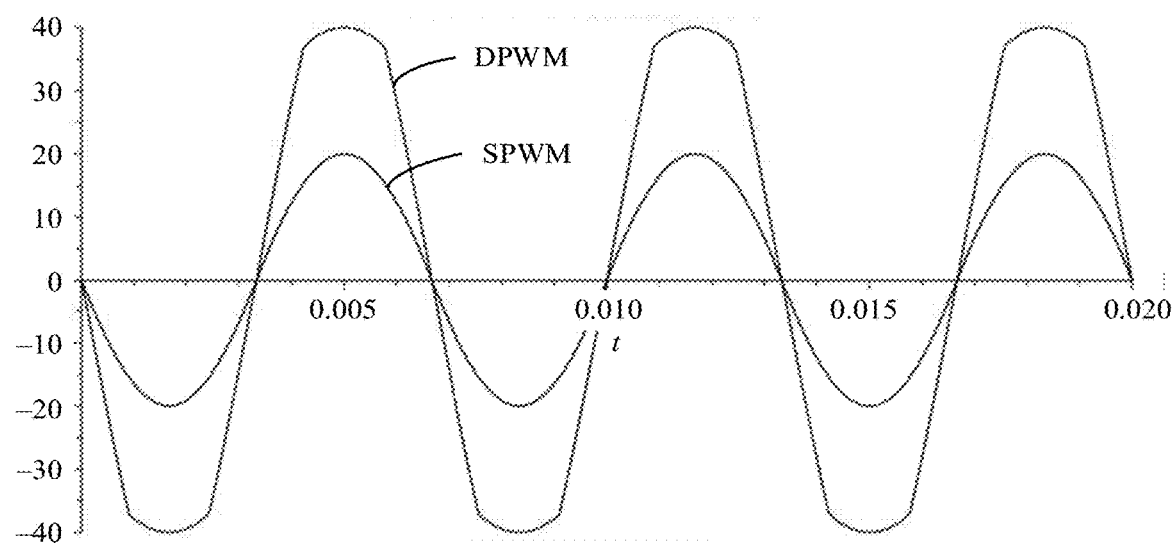
FIG. 3C is a schematic diagram of comparison between a waveform of a ripple current in a busbar capacitor on a direct-current side in a conventional DPWM modulation scheme and a waveform of a ripple current in a busbar capacitor on a direct-current side in an SPWM modulation scheme.

Replacing SPWM modulation with DPWM modulation can effectively suppress a high-frequency switch loss in an operation process of the inverter. FIG. 3A is a schematic diagram of comparison between a waveform of a modulation wave in DPWM and a waveform of a modulation wave in SPWM. FIG. 3B shows an output voltage $V_{az}$ at a phase A output node in the DPWM modulation and a filtered output phase voltage $V_{AO}$ of the phase A. FIG. 3C is a diagram of comparison between a waveform of a ripple current in a busbar capacitor on a direct-current side in a conventional DPWM modulation scheme and a waveform of a ripple current in a busbar capacitor on a direct-current side in an SPWM modulation scheme.

As shown in FIG. 3A, in the DPWM modulation scheme, the modulation wave in DPWM is clamped at 1 in a time period in each cycle of the DPWM modulation wave, for example, in a clamping time period of about ⅓ of a cycle of a fundamental wave, so that the modulation wave is always greater than the carrier in the time period. In this way, as shown in FIG. 3B, the voltage $V_{az}$ at the phase A output node is always clamped at a positive busbar voltage or a negative busbar voltage in this time period. The phase B and the phase C have similar cases. The modulation wave is clamped at 1 in a time period. The phase branch of the corresponding phase does not have a switch operation in this time period, which effectively reduces a switch loss. Therefore, the DPWM modulation scheme has obvious advantages in system efficiency.

However, in comparison with the SPWM modulation scheme, the DPWM scheme also has some adverse impact. As shown in FIG. 3C, a ripple current in a busbar capacitor on a direct-current side may be significantly increased in the DPWM modulation scheme. To suppress the ripple current, a size of the busbar capacitor needs to be further increased, which increases the overall costs of the inverter.

In order to suppress an increased ripple current in the DPWM modulation scheme and avoid an increase of busbar capacitors at the same time, generally, two methods are used. One method is switching between the DPWM modulation scheme and the SPWM modulation scheme based on a magnitude of the ripple current in the busbar capacitor. To be specific, when the ripple current is relatively large, the SPWM modulation scheme is used, or otherwise, the DPWM modulation scheme is used, to avoid an excessively large ripple current. In this method, the SPWM modulation scheme needs to be used instead of the DPWM modulation scheme. No clamping time period exists in the SPWM modulation scheme. Therefore, a switch loss is increased, and conversion efficiency of the inverter is reduced. The other method is to properly reduce duration in which the DPWM modulation wave is clamped at 1, to reduce a common-mode quantity in the DPWM modulation wave, thereby suppressing the increase of the ripple current. The second method attempts to reduce the ripple current and maintain the advantages of the DPWM in conversion efficiency to a greatest extent. Although a clamping time period without a switch operation does not exist in the second method, the switch loss is still inevitably increased because the clamping time period is shortened. It can be learned that the current DPWM technology has a problem that reduction of the switch loss and suppression of the ripple current cannot be both considered.

To resolve the foregoing problem, embodiments of this disclosure provide a new control method of a three-phase multi-level inverter. Studies indicate that although the ripple current in the SPWM modulation scheme is significantly less than that in the DPWM modulation scheme under most operating conditions, the ripple current in the busbar capacitor in the DPWM modulation scheme is less than that in the SPWM modulation scheme under some operating conditions especially when the modulation ratio is relatively large. In other words, contribution of a common-mode voltage regulation quantity of the DPWM modulation wave to the ripple current is actually related to a magnitude of the modulation ratio. On this basis, a common-mode voltage regulation signal of the DPWM modulation wave may be determined or adaptively regulated through determining the modulation ratio based on the modulation ratio and a modulation ratio threshold, to obtain the modulation wave in the DPWM modulation scheme. In this manner, when the switch loss is reduced and efficiency is improved, the ripple current in the busbar capacitor can be maintained at a relatively low level. In this way, the busbar capacitor does not need to be increased, thereby reducing the system costs.

In order that a person skilled in the art better understands the technical solutions provided in embodiments of this disclosure, the following first describes an example application scenario of this disclosure.

Figure 4A:
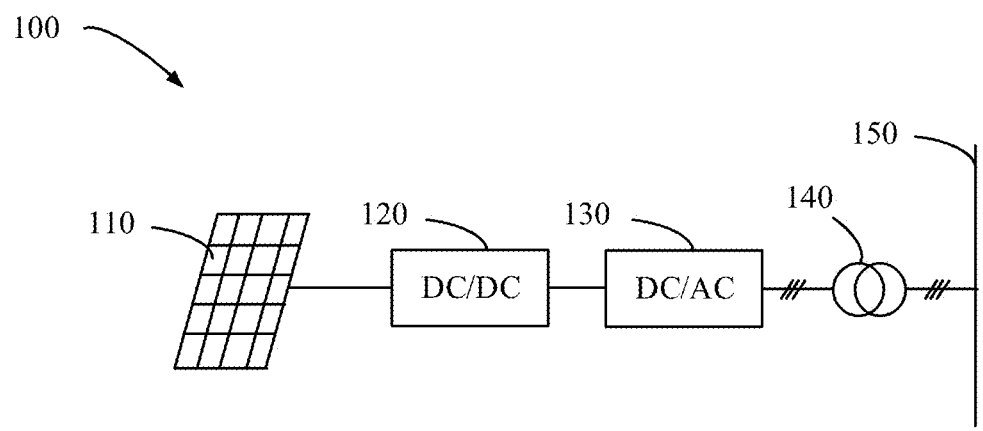
FIG. 4A is a schematic diagram of a photovoltaic power generation system that can be implemented in some embodiments of this disclosure.

FIG. 4A is a schematic diagram of a photovoltaic power generation system 100 that can be implemented in some embodiments of this disclosure. It should be noted that an application scenario of this disclosure is not limited thereto. The application scenario includes any scenario in which direct-current power needs to be converted to three-phase alternating-current power, for example, a small/medium-sized distributed power station or an uninterruptible power supply (UPS) power supply.

The photovoltaic power generation system 100 includes a photovoltaic module 110, a converter device 120 for DC-DC conversion, an inverter device 130 for DC-AC conversion, a transformer 140, and a power grid 150. The photovoltaic module 110 may be a photovoltaic battery array in a large-sized photovoltaic power station. Alternatively, the photovoltaic module 110 may be a household photovoltaic battery pack. The photovoltaic module 110 is connected to an input side of the converter device 120. The converter device 120 converts a received direct-current voltage to another direct-current voltage. An output side of the converter device 120 may access the inverter device 130 in series or in parallel. The inverter device 130 is configured to convert direct-current power generated by the photovoltaic module 110 to the three-phase alternating-current power. The inverter device 130 may be any proper type of inverter, for example, a string inverter or a centralized inverter. Subsequently, the inverter device 130 is connected to the transformer 140. The transformer 140 may convert a voltage output by the inverter device 130 to a power grid voltage, to input power to the power grid system or the off-grid system 150.

Figure 4B:
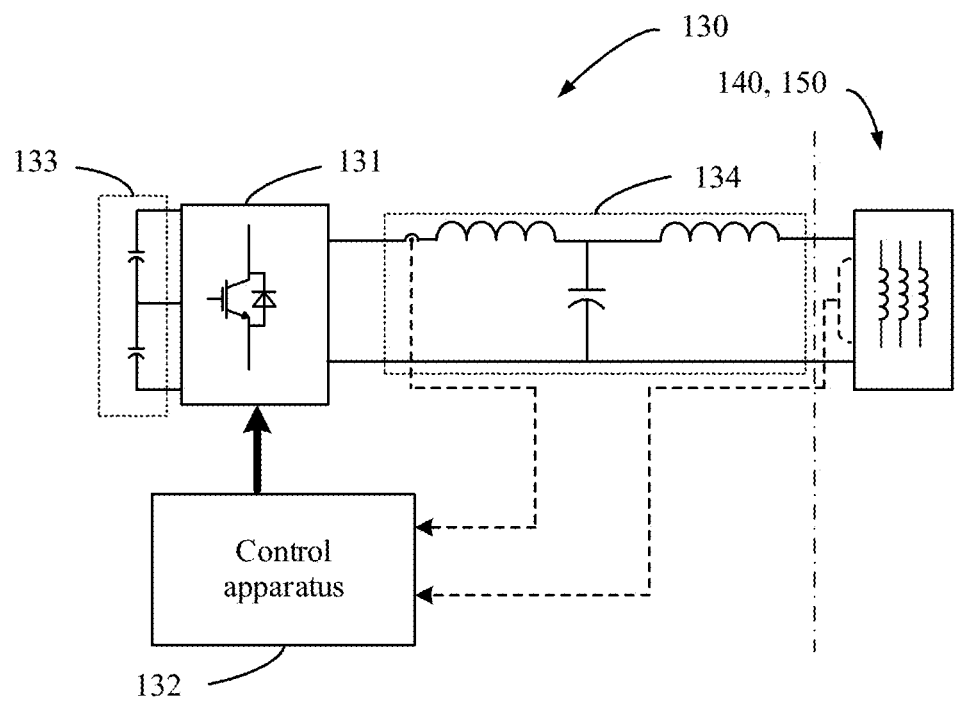
FIG. 4B is a schematic diagram of an inverter device and a lower-level device in FIG. 4A.

FIG. 4B is a schematic diagram of an inverter device 130 and a lower-level device in FIG. 4A. The inverter device 130 includes a three-phase multi-level inverter 131, a control apparatus 132, a busbar capacitor component 133, and a filtering component 134. Further, the busbar capacitor 133 may be connected to a component on a direct-current side, for example, the converter device 120 or the photovoltaic module 110, and further connected to an input side of the inverter 131, to receive the direct-current power generated by the photovoltaic module 110 and input the direct-current power to the inverter 131. The inverter 131 may include a semiconductor switch device. The semiconductor switch device is controlled to convert direct-current power from the direct-current side to required alternating-current power. For example, the inverter 131 may be the three-phase three-level inverter shown in FIG. 1. However, this disclosure is not limited thereto. The inverter 131 may be a three-phase multi-level inverter with another proper quantity of levels. An output side of the inverter 131 is connected to the filtering component 134. The filtering component 134 provides a filtered voltage to the lower-level device, for example, the transformer 140 and the power grid 150. For brevity and clarity, FIG. 4B shows only output of only one phase. The control apparatus 132 may implement control on the semiconductor switch device in the inverter 131. The control apparatus 132 receives a sensed electrical quantity required for the control, for example, an output voltage or an output current. Alternatively, the control apparatus 132 may also receive another electrical quantity indicating a circuit status. The control apparatus 132 may control on/off of the semiconductor switch device in the inverter 131.

Figure 5:
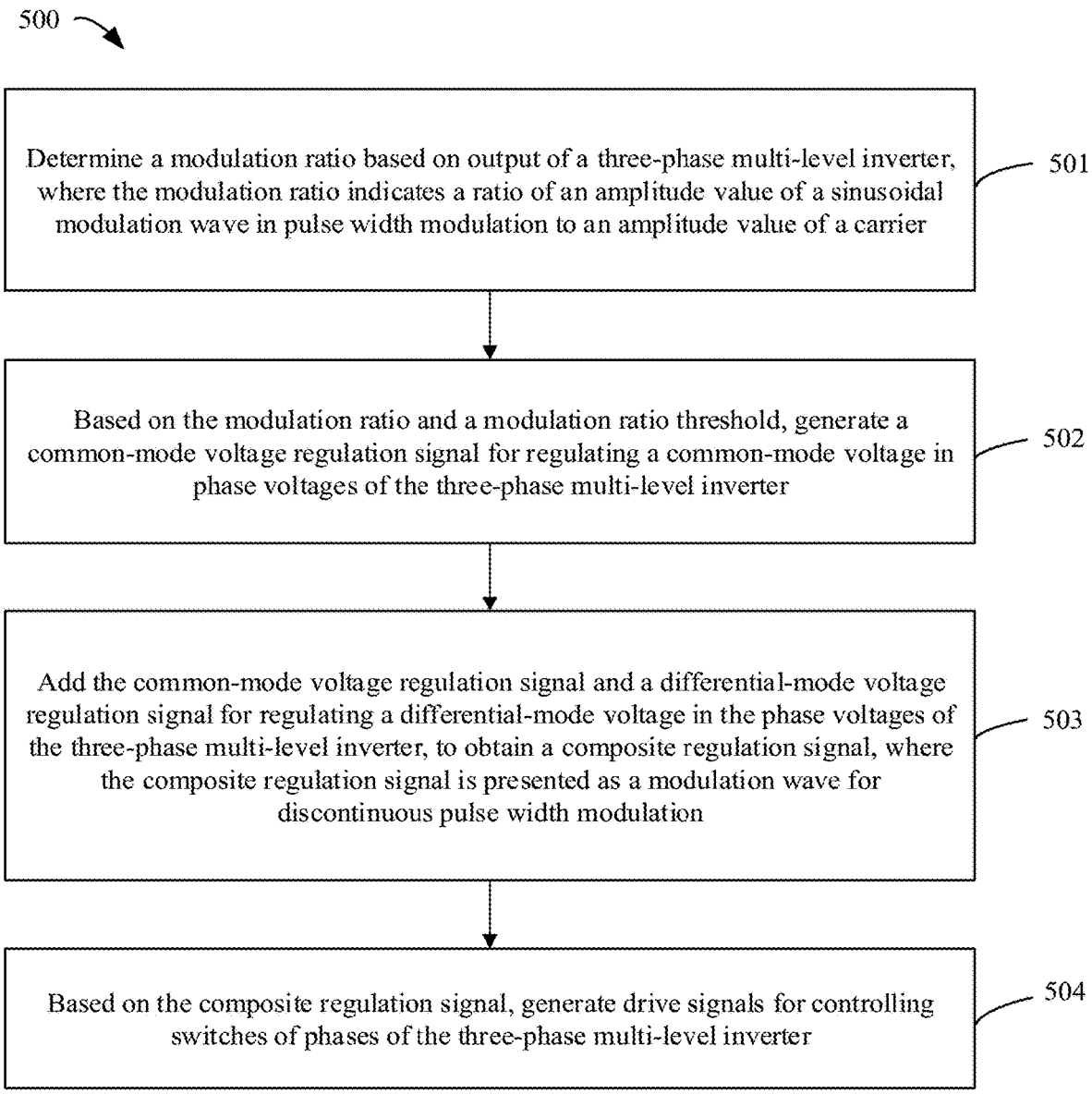
FIG. 5 is a block diagram of a process of a control method of a three-phase multi-level inverter according to some embodiments of this disclosure.

FIG. 5 is a schematic flowchart of a control method 500 of a three-phase multi-level inverter 131 according to an embodiment of this disclosure. The method 500 may be implemented in the inverter device 130 in FIG. 4A and FIG. 4B, and is performed by the control apparatus 132. It may be understood that the aspects described in FIG. 4 may be applied to the method 500. For discussion purposes, the method 500 is described with reference to FIG. 4A and FIG. 4B.

In a block 501, the control apparatus 132 determines the modulation ratio based on output of the three-phase multi-level inverter 131. The modulation ratio indicates a ratio of an amplitude value of a sinusoidal modulation wave in PWM to an amplitude value of a carrier. In the field of power electronic technologies, the modulation ratio of the inverter generally indicates a ratio of an amplitude value of a modulation wave to an amplitude value of a carrier. The modulation ratio essentially reflects a conversion relationship between a direct-current busbar voltage input to the inverter and an alternating-current output voltage output by the inverter. In the SPWM modulation, the modulation ratio indicates a ratio of an amplitude value of a sinusoidal modulation wave to an amplitude value of a carrier. The DPWM modulation is actually an improved solution of the SPWM modulation. The modulation wave in the DPWM is usually formed through superimposing the sinusoidal modulation wave and a common-mode component in the SPWM. Sinusoidal modulation waves of phases with phase differences in the SPWM correspond to differential-mode voltages in phase voltages of phases in the three-phase multi-level inverter. Therefore, a sinusoidal modulation wave of each phase may also be referred to as a differential-mode component. The common-mode component corresponds to a common-mode voltage in the phase voltages of the phases. However, the common-mode component does not contribute to a line to line voltage of the inverter. Therefore, the modulation ratio in the DPWM is still the ratio of the amplitude value of the sinusoidal modulation wave as the differential-mode component to the amplitude value of the carrier. It can be learned that, to determine the modulation ratio in the DPWM modulation, the sinusoidal modulation wave and the carrier generally need to be determined.

For example, the control apparatus 132 may pre-define the carrier for PWM. For example, the control apparatus 132 may pre-define an amplitude value and a frequency of a triangular carrier. For an example of the carrier, refer to the phase A modulation wave in FIG. 2 and the carriers: C1 and C2 in the carriers. It may be understood that the carrier in FIG. 2 is merely an example. Other proper forms of carriers may be used (for example, a single carrier with a peak value of +1 and a trough value of −1). To obtain an output voltage closer to a sinusoidal wave, the frequency of the carrier may be much higher than the frequency of the modulation wave. For example, the frequency of the modulation wave is 50 hertz, and the frequency of the carrier may be up to thousands of hertz.

For example, the control apparatus 132 may obtain a sinusoidal modulation wave based on an output electrical quantity of the inverter 131. The output electrical quantity includes, for example, an output voltage and an output current of the inverter. A specific implementation of the output electrical quantity is related to a control manner of the inverter. For example, when the inverter uses closed-loop control, the output electrical quantity may indicate a difference between an actual output electrical quantity (for example, obtained by using a sensing apparatus) of the inverter 131 and a pre-defined reference output electrical quantity. When the inverter uses open-loop control, the output electrical quantity may directly indicate a pre-defined reference output electrical quantity. In some embodiments, the control apparatus 132 may determine the amplitude value of the sinusoidal modulation wave based on the output electrical quantity, and obtain the modulation ratio through calculating the ratio of the amplitude value of the sinusoidal modulation wave to the pre-defined amplitude value of the carrier. It can be learned that, when the output electrical quantity automatically changes or varies with fluctuation of the busbar voltage, the modulation ratio also changes correspondingly.

In a block 502, the control apparatus 132 generates, based on the modulation ratio and a modulation ratio threshold, a common-mode voltage regulation signal for regulating a common-mode voltage in phase voltages of the three-phase multi-level inverter 131. For example, the modulation wave in the DPWM is generally formed through superimposing the sinusoidal modulation wave as the differential-mode component and the common-mode voltage regulation signal (that is, the common-mode component) for regulating the common-mode voltage in the phase voltages. The common-mode voltage regulation signal is superimposed on the sinusoidal modulation wave. The modulation wave in the DPWM is clamped at 1 in a part of a time period in each cycle, for example, ⅓ of each cycle. Therefore, a switch device of each phase does not have a switch operation in a specific time period in each cycle of the modulation wave, thereby reducing the switch loss. In other words, generally, after the sinusoidal modulation wave and the clamping time period are determined, the common-mode voltage regulation signal may be determined through calculation. The clamping time period may be predefined according to a requirement.

Injecting the common-mode voltage regulation signal to the modulation wave can facilitate reduction of the switch loss, but also causes adverse impact. Generally, the ripple current in the busbar capacitor is increased due to the existence of the common-mode voltage regulation signal. As described above, a current solution is to switch the DPWM modulation to the SPWM modulation when the ripple current is relatively large. In other words, when the ripple current is relatively large, the common-mode voltage regulation signal is no longer injected to the modulation wave. Another solution is to reduce the time period in which the modulation wave is clamped at 1 in a process of the DPWM modulation, thereby reducing the injected common-mode voltage regulation signal. Apparently, in both the two methods, the switch loss is increased, and overall efficiency is reduced.

However, studies find that, in the DPWM modulation, the ripple current in the busbar capacitor depends not only on the common-mode voltage regulation signal in the modulation wave, but also is related to the magnitude of the modulation ratio. Especially, the ripple current in the DPWM modulation scheme is not always greater than that in the SPWM modulation scheme under all operating conditions. For example, the ripple current in the busbar capacitor in the DPWM modulation scheme is less than that in the SPWM modulation scheme under some operating conditions especially when the modulation ratio is relatively large. In other words, the ripple current in the busbar capacitor is not always increased due to the common-mode voltage regulation signal. A reason for this case is that, when the modulation ratio is relatively large, that is, when the ratio of the amplitude value of the sinusoidal modulation wave to the amplitude value of the carrier is relatively large, to obtain a modulation wave that is clamped at 1 in a part of a time period in the DPWM, a polarity (or an injection direction) of the common-mode voltage regulation signal is reversed. The reversed common-mode voltage regulation signal facilitates reduction of the ripple current in the busbar capacitor.

Figure 6:
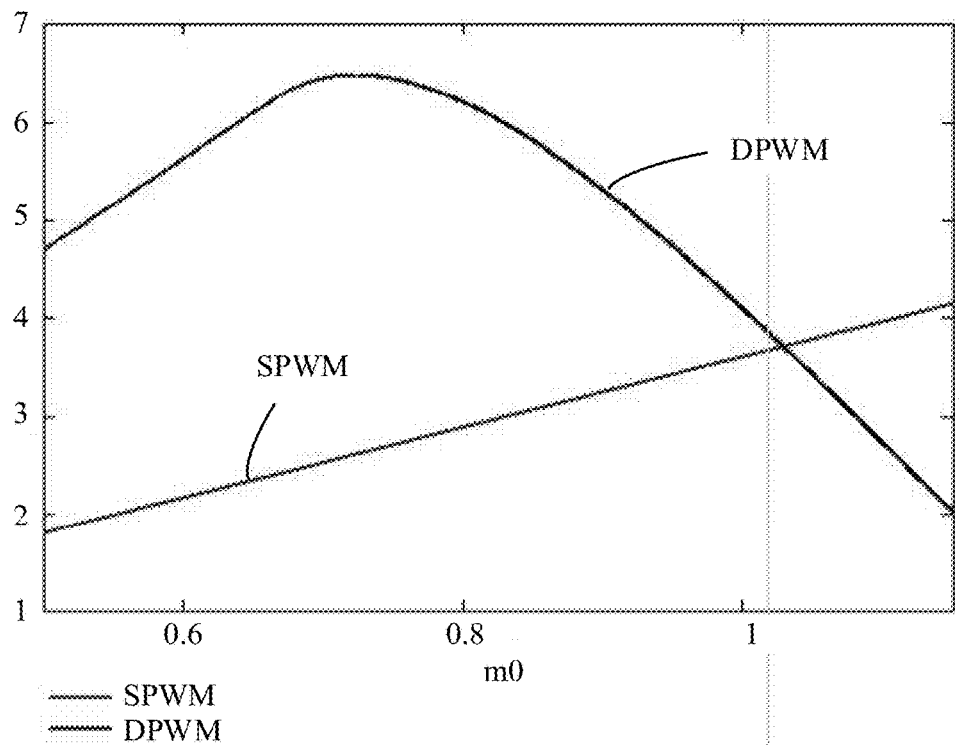
FIG. 6 is a curve chart of valid values of ripple currents in SPWM and DPWM at different modulation ratios according to some embodiments of this disclosure.

FIG. 6 is a curve chart of valid values of ripple currents in SPWM and DPWM at different modulation ratios. In FIG. 6, a lateral axis represents the modulation ratio in the SPWM and the DPWM, and a longitudinal axis represents a valid value of the ripple current in the busbar capacitor. It can be learned that, with an increase of the modulation ratio, the ripple current in the SPWM modulation is always in a rising trend, and the ripple current in the DPWM modulation increases with the increase of the modulation ratio when the modulation ratio is relatively small, and decreases with the increase of the modulation ratio when the modulation ratio is relatively large. After the modulation ratio reaches a specific modulation ratio threshold, the ripple current in the DPWM modulation is less than the ripple current in the SPWM modulation. For example, the modulation ratio threshold may be a modulation ratio at an intersection of an SPWM curve and a DPWM curve in FIG. 6.

On this basis, in this embodiment of this disclosure, the control apparatus 132 may facilitate determining of the common-mode voltage regulation signal based on the modulation ratio and the modulation ratio threshold, so that the common-mode voltage regulation signal is regulated to facilitate suppression on the ripple current in the busbar capacitor. For example, the control apparatus 132 may help improvement or regulation of the common-mode voltage regulation signal based on a comparison result or a difference between the modulation ratio and the modulation ratio threshold. For example, when the modulation ratio exceeds the modulation ratio threshold, a relatively large common-mode voltage regulation signal may be generated. The more the modulation ratio exceeds the modulation ratio threshold, the larger the common-mode voltage adjustment signal may be. Therefore, the clamping time period without the switch operation can be obtained to a greatest extent, to reduce the switch loss and suppress the ripple current in the busbar capacitor. Alternatively, when the modulation ratio is less than the modulation ratio threshold, a relatively small common-mode voltage regulation signal may be generated. The more the modulation ratio is less than the modulation ratio threshold, the smaller the common-mode voltage regulation signal may be. Therefore, the ripple current in the busbar capacitor is reduced as much as possible. Apparently, unlike the conventional DPWM modulation and different from an improved manner of the conventional DPWM of directly removing or reducing the common-mode voltage regulation signal, in this embodiment of this disclosure, the common-mode voltage regulation signal may be automatically regulated in an adaptive manner to balance both the switch loss and the ripple current in the busbar capacitor, thereby optimizing the DPWM modulation scheme.

In a block 503, the control apparatus 132 adds the generated common-mode voltage regulation signal and a differential-mode voltage regulation signal for regulating a differential-mode voltage in the phase voltages of the three-phase multi-level inverter 131, to obtain a composite regulation signal. The composite regulation signal is presented as a modulation wave for DPWM. For example, a differential-mode voltage regulation signal of each phase is used to regulate the differential-mode voltage in the phase voltages of the phases, and corresponds to the sinusoidal modulation wave of each phase mentioned in the block 501. To obtain the modulation wave for implementing the DPWM, the differential-mode voltage regulation signal and the common-mode voltage regulation signal may be superposed, to generate the composite regulation signal. The DPWM modulation wave represented by using the composite regulation signal is clamped at 1 in a part of a time period in a cycle of each modulation wave, and further has an optimized common-mode component. In other words, the ripple current in the busbar capacitor is not increased due to the optimized common-mode component.

In a block 504, the control apparatus 132 generates, based on the composite regulation signal, drive signals for controlling switches of phases of the three-phase multi-level inverter 131. For example, the composite regulation signal indicating a modulation wave may be compared with a carrier signal, to obtain a drive signal for controlling on/off of a switch of each phase. Because the common-mode component in the modulation wave can be optimized in an adaptive regulation manner, when driven by the drive signal corresponding to the modulation wave, a switch of each phase has advantages of the DPWM modulation, that is, reducing the switch loss by using the clamping time period without the switch operation, and also suppresses the ripple current in busbar capacitor to a relatively low level.

Figure 7:
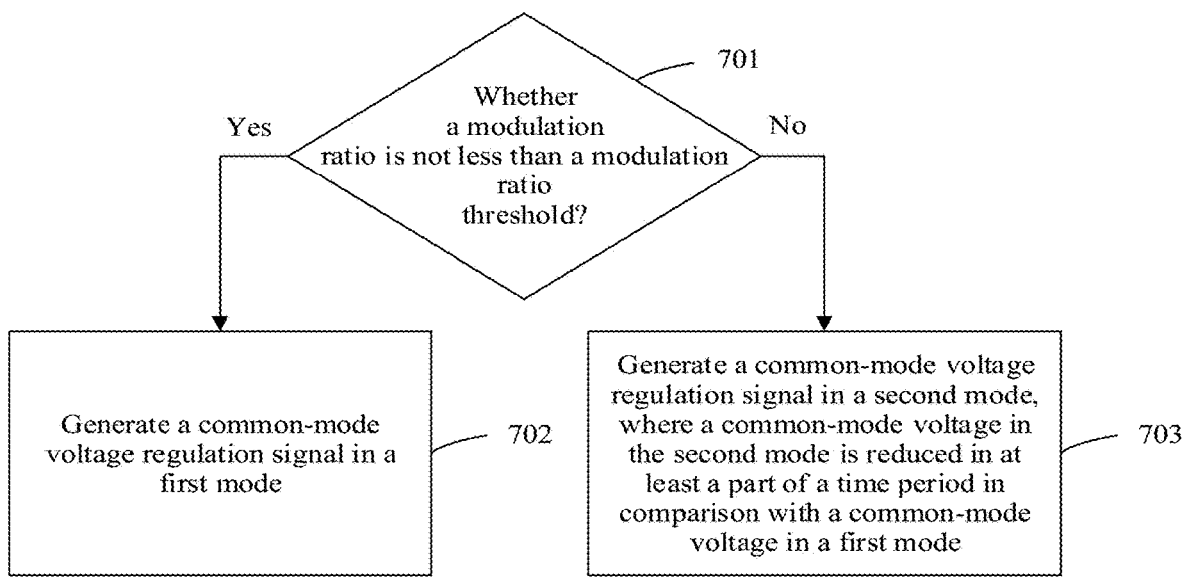
FIG. 7 is a schematic flowchart of an example process of generating a common-mode voltage regulation signal.

FIG. 7 is a schematic flowchart of an example process of generating a common-mode voltage regulation signal. The process shown in FIG. 7 may be implemented in the block 502 of FIG. 5.

In a block 701, the control apparatus 132 may compare the modulation ratio with the modulation ratio threshold, to determine whether the modulation ratio is not less than the modulation ratio threshold. For example, as described above, an impact of the common-mode voltage regulation signal on a ripple of the busbar capacitor is affected by the modulation ratio. When the modulation ratio exceeds a specific threshold, the common-mode voltage regulation signal facilitates suppression on the ripple of the busbar capacitor. Therefore, the control apparatus 132 may directly compare the modulation ratio with the modulation ratio threshold, and determine based on a comparison result how to determine the common-mode voltage regulation signal. In this manner, the generation of the common-mode voltage regulation signal can be adaptively regulated in a simple quick manner.

Figure 9A:
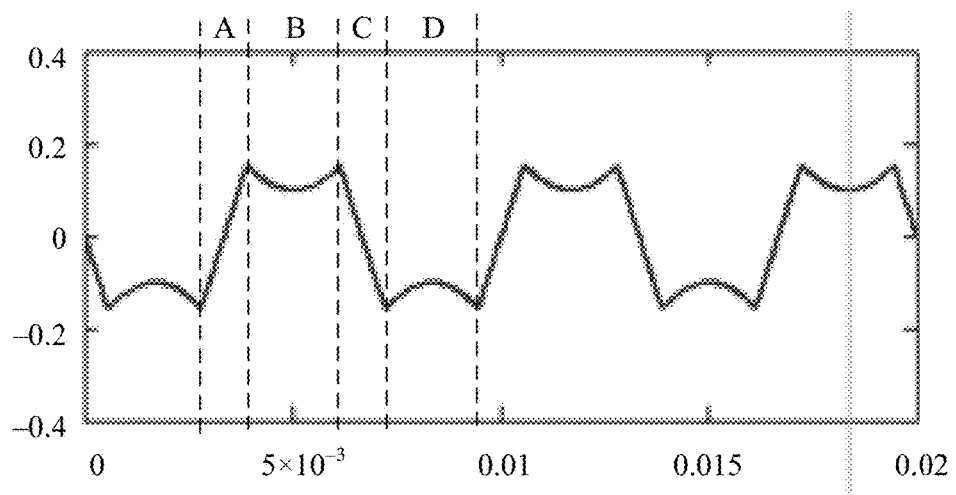
FIG. 9A is a schematic diagram of an example of a common-mode voltage regulation signal in a first mode according to some embodiments of this disclosure.

In a block 702, when the modulation ratio is not less than the modulation ratio threshold, the control apparatus 132 generates the common-mode voltage regulation signal in a first mode. For example, that the modulation ratio is not less than the modulation ratio threshold indicates that the common-mode voltage regulation signal or the common-mode voltage facilitates reduction of the ripple current of the busbar voltage. Therefore, the first mode may be used during the generation of the common-mode voltage regulation signal. The first mode may be a mode of generating the common-mode voltage regulation signal in the conventional DPWM modulation. For an example of the first mode, refer to FIG. 9A. FIG. 9A is a schematic diagram of an example of the common-mode voltage regulation signal in the first mode. For example, the first mode may be a mode of obtaining the common-mode voltage regulation signal in the conventional DPWM modulation. Further, the common-mode voltage regulation signal in the first mode may be determined through calculation or in another proper manner based on the differential-mode voltage regulation signal (that is, a sinusoidal modulation wave) in the modulation wave in the DPWM and a location or a phase and duration of the clamping time period of being clamped at 1. More further, for example, an expected DPWM modulation wave of each phase may be predefined. The modulation wave in a predefined section is clamped at 1. The modulation wave in another section may be the same as the SPWM modulation wave, that is, the sinusoidal modulation wave. A quantity of the sinusoidal modulation wave of a corresponding phase is subtracted from a quantity of the expected DPWM modulation wave of each phase, to obtain a plurality of differences. The differences respectively correspond to additional quantities required for clamping modulation waves of phases in the plurality of phases at 1. In addition, these differences are combined to obtain the common-mode voltage regulation signal in the first mode. It may be understood that the first mode is not limited to the foregoing descriptions, and may be another proper mode of the DPWM modulation, provided that each phase is clamped within a predetermined time period of a single sinusoidal wave cycle or a part of a switch cycle without a switch operation.

In a block 703, when the modulation ratio is less than the modulation ratio threshold, the control apparatus 132 generates the common-mode voltage regulation signal in a second mode. A common-mode voltage in the second mode is reduced in at least a part of a time period in comparison with a common-mode voltage in the first mode. For example, that the modulation ratio is less than the modulation ratio threshold indicates that a ripple current of a busbar voltage is increased due to the common-mode voltage regulation signal or the common-mode voltage. Therefore, the common-mode voltage regulation signal may be generated in the second mode different from the first mode. The common-mode voltage in the second mode is less than the common-mode voltage in the first mode in at least a part of a time period, to reduce an adverse impact on the ripple current.

Figure 8:
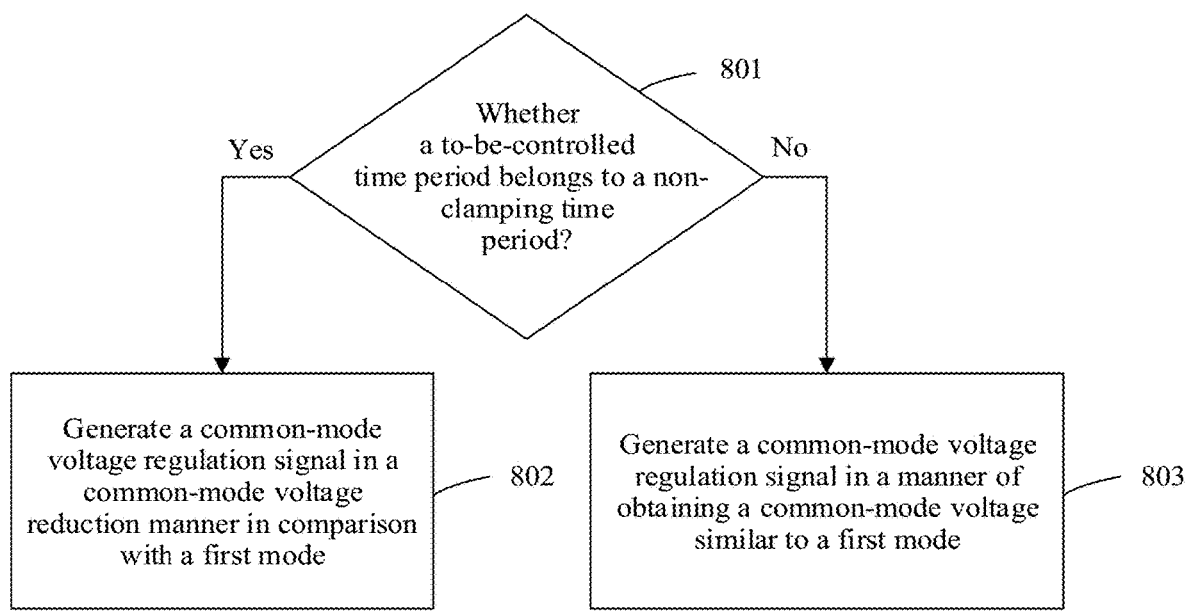
FIG. 8 is a schematic flowchart of an example process of generating a common-mode voltage regulation signal in a second mode.

FIG. 8 is a schematic flowchart of an example process of generating a common-mode voltage regulation signal in a second mode. The process shown in FIG. 8 may be implemented in the block 703 of FIG. 7.

In a block 801, the control apparatus 132 determines whether a to-be-controlled time period belongs to a clamping time period or a non-clamping time period. For an example of the clamping period, refer to a time period in which the DPWM modulation wave in FIG. 3A is clamped at 1. This time period may be specified in advance in a predefining manner. For example, this time period may be ⅓ of the sinusoidal modulation wave cycle on two sides of a peak moment and a trough moment. With reference to FIG. 9A, the clamping time period corresponds to a time period B and a time period D in the common-mode voltage regulation signal, and the non-clamping time period corresponds to a time period A and a time period C in the common-mode voltage regulation signal. FIG. 9A shows examples of only segments of a single cycle. This is also applicable to other cycles. In other words, the DPWM modulation wave is clamped at 1 due to the common-mode voltage regulation signal in the time period B and the time period D, so that a corresponding phase does not have the switch operation in the clamping time periods B and D. In the DPWM, the clamping time period is a time period of actually reducing the switch loss. In other words, the switch loss in the DPWM depends on the duration of the clamping time period. In addition, because the clamping time period is specified in advance according to a requirement, before the control apparatus 132 generates the actual modulation wave, the control apparatus 132 may determine whether the to-be-controlled time period is within the predetermined clamping time period.

In a block 802, the common-mode voltage regulation signal is generated in a common-mode voltage reduction manner in a non-clamping time period in comparison with the first mode. The non-clamping time period uses DPWM and has a switch operation. For example, if the to-be-controlled time period belongs to the non-clamping time periods A and C, it indicates that the common-mode voltage regulation signal to be generated in this case is a signal in a time period that does not contribute to reduction of the switch loss. In addition, when a current modulation ratio is less than the modulation ratio threshold, the common-mode voltage generated based on the common-mode voltage regulation signal causes an increase of the ripple current in the busbar capacitor. Therefore, to avoid the increase of the ripple current, the common-mode voltage regulation signal in the non-clamping time periods A and C can be reduced as much as possible.

Figure 9B:
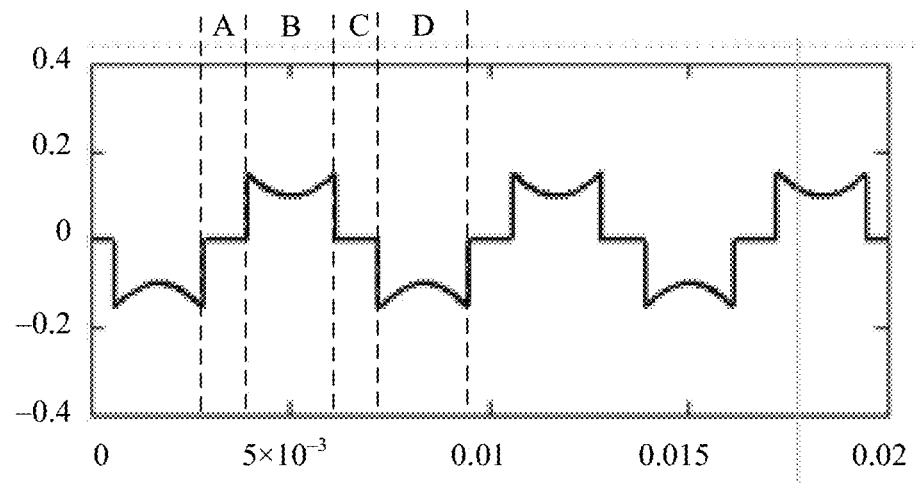
FIG. 9B, FIG. 9C, and FIG. 9D are schematic diagrams of examples of a common-mode voltage regulation signal in a second mode according to some embodiments of this disclosure.

FIG. 9B shows an example implementation of the common-mode voltage regulation signal in the second mode. In some embodiments of this disclosure, a common-mode voltage regulation signal for setting a common-mode voltage to zero is generated in the non-clamping time periods A and C. With reference to FIG. 9A and FIG. 9B, it can be learned that, in comparison with the non-clamping time periods A and C in the first mode in FIG. 9A, an absolute value of the common-mode voltage regulation signal in the non-clamping time periods A and C in the second mode in FIG. 9B is directly reduced to zero. Therefore, a corresponding common-mode voltage is set to zero. In this way, the ripple current caused due to the common-mode voltage in the non-clamping time period is avoided to a greatest extent. However, it may be understood that embodiments of this disclosure are not limited thereto. The common-mode voltage may be reduced to a non-zero voltage in the time periods A and C, provided that the common-mode voltage can be suppressed to a specific extent to reduce the ripple current in the busbar capacitor.

Figure 9C:
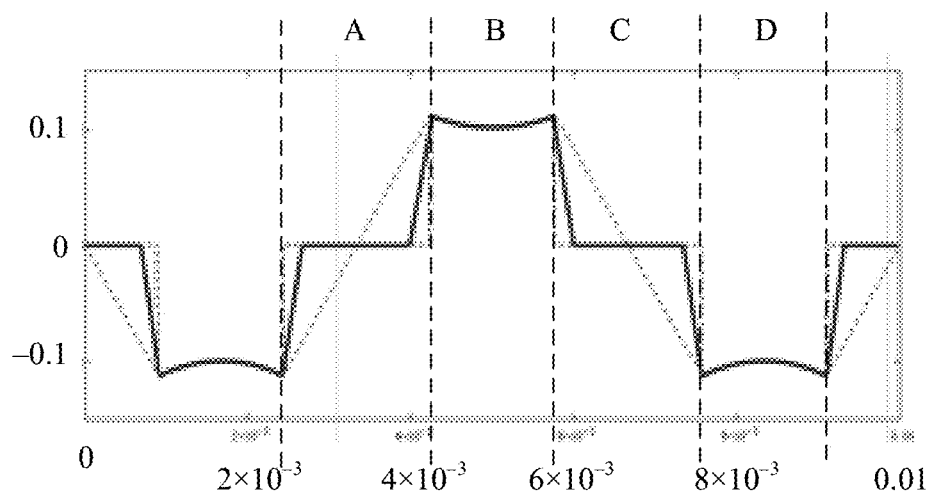
Figure 9D:
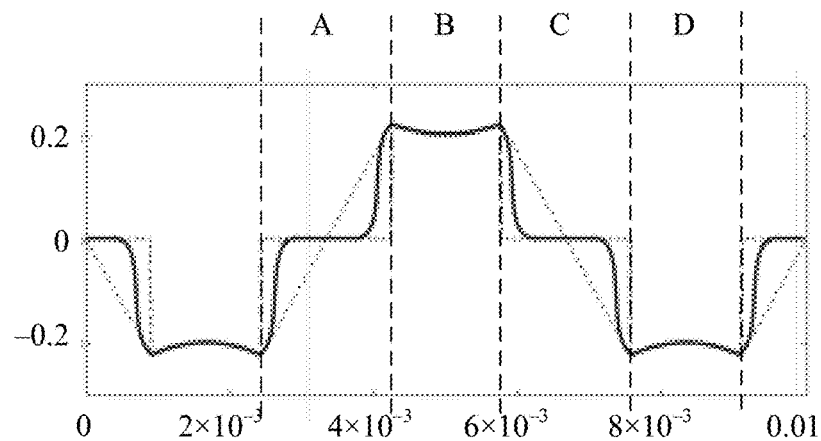

FIG. 9C and FIG. 9D show another example implementation of the common-mode voltage regulation signal in the second mode. In some embodiments of this disclosure, a common-mode voltage regulation signal for setting a common-mode voltage to a graded step voltage is generated in the non-clamping time periods A and C. The graded step voltage gradually changes from a first voltage value to zero and gradually changes from zero to a second voltage value with time. The first voltage value is different from the second voltage value. For example, slowly change processing may be performed when the common-mode voltage is suppressed in the non-clamping time periods A and C. If the common-mode voltage regulation signal in the non-clamping time periods A and C are directly set to zero, a step occurs between the non-clamping time period and the clamping time period. This step may cause common-mode oscillation that is not expected. The step between the non-clamping time period and the clamping time period can be eliminated through slowly change processing in a process of reducing the common-mode voltage regulation signal in the non-clamping time periods A and C, to avoid the common-mode oscillation. For example, the common-mode voltage regulation signal on which slowly change processing is performed may be obtained by using the following equations.

$$u_{cmv\_opt} = \begin{cases} u_{cmv} & \text{Clamping time period} \\ f(t) * u_{cmv} & 0 \le f(t) < 1 \quad \text{Non-clamping time period} \end{cases}$$

Herein, $u_{cmv\_opt}$ represents the common-mode voltage regulation signal obtained after the slowly change processing, $u_{cmv}$ represents the common-mode voltage regulation signal in the conventional DPWM modulation or in the first mode, and f(t) represents a regulation coefficient of the slowly change processing.

It can be learned that, in FIG. 9C and FIG. 9D, an absolute value of the common-mode voltage regulation signal in the second mode in the non-clamping time periods A and C is reduced and increased in a gradually change manner. Therefore, the common-mode voltage is regulated in the gradually change manner, thereby avoiding the common-mode oscillation.

In a block 803, the common-mode voltage regulation signal is generated in a manner of obtaining the common-mode voltage similar to the first mode when the to-be-controlled time period belongs to the clamping time periods B and D. For example, the clamping time periods B and D are associated time periods of reducing the switch loss in the DPWM. Reduction of the common-mode voltage regulation signal in the clamping time period should be avoided. Therefore, in this time period, the common-mode voltage regulation signal that is basically the same as the common-mode voltage regulation signal in the first mode may be generated. For example, in this time period, the common-mode voltage regulation signal may be generated in the foregoing described manner about the first mode. With reference to the common-mode voltage regulation signal in the second mode shown in FIG. 9B, FIG. 9C, and FIG. 9D, a waveform of the common-mode voltage regulation signal in the time periods B and D in these figures are basically the same as a waveform of the common-mode voltage regulation signal in the first mode shown in FIG. 9A in the time periods B and D, to ensure that the clamping time period of determining the switch loss remains unchanged.

Figure 10A:
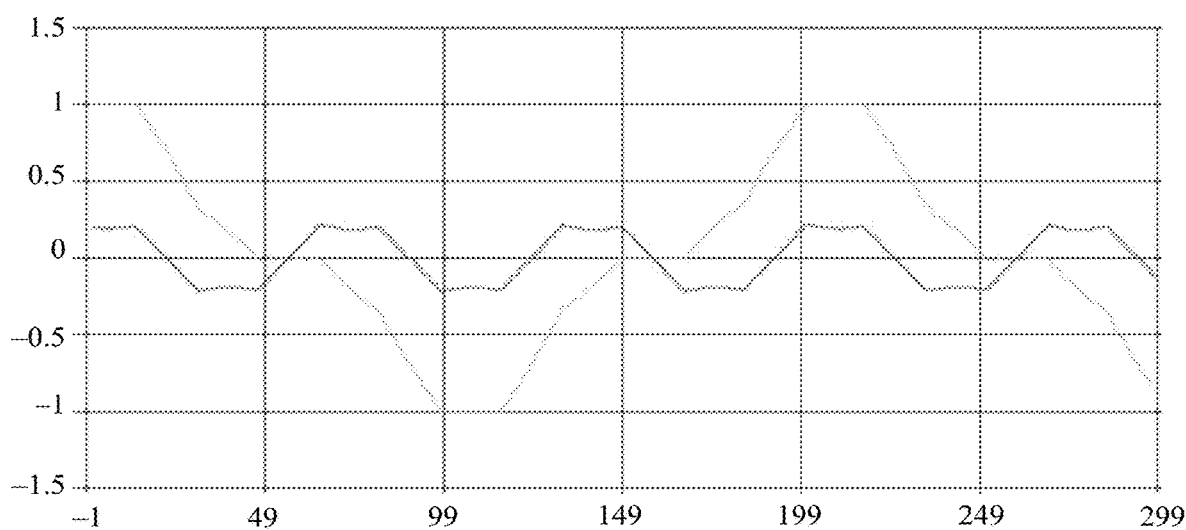
FIG. 10A is a schematic diagram of examples of a common-mode voltage regulation signal and a composite regulation signal in conventional DPWM modulation.
Figure 10B:
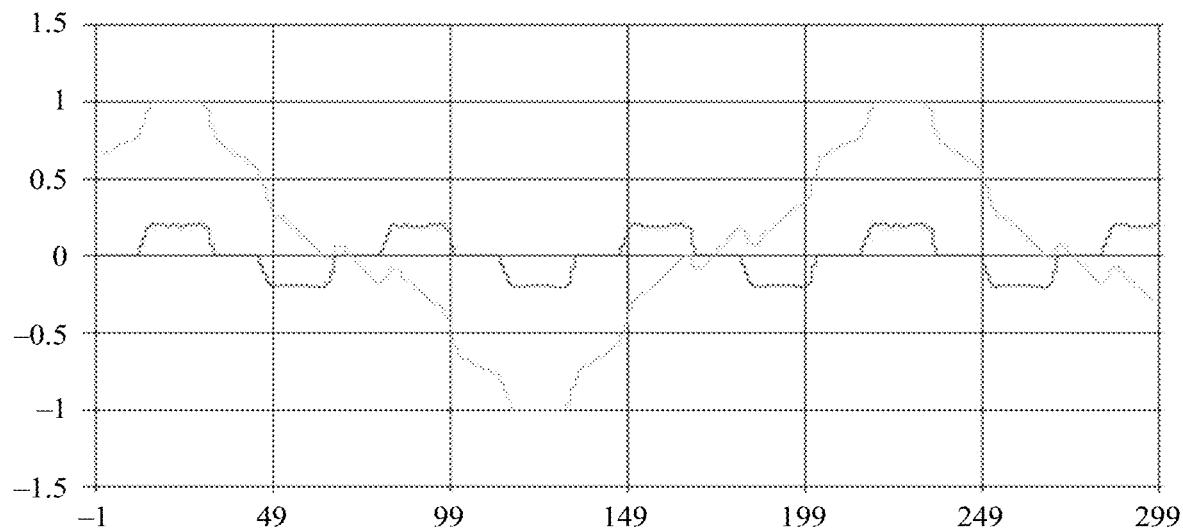
FIG. 10B is a schematic diagram of examples of a common-mode voltage regulation signal and a composite regulation signal according to some embodiments of this disclosure.

FIG. 10A is a waveform diagram of a common-mode voltage regulation signal and a composite regulation signal in the conventional DPWM modulation. FIG. 10B is a waveform diagram of a common-mode voltage regulation signal and a composite regulation signal according to an embodiment of this disclosure. It should be noted that both FIG. 10A and FIG. 10B show only example waveforms of composite regulation signals of one phase in three phases. It can be learned that, in comparison with the waveform of the composite regulation signal in the conventional DPWM modulation, the waveform of the composite regulation signal in an embodiment of this disclosure changes only at a non-clamping segment of not being clamped at 1, and basically remains the same in the clamping segment of being clamped at 1.

In this manner, advantages superior to conventional technologies can be obtained. Further, to suppress the ripple current in the busbar capacitor, in the foregoing conventional manner, the common-mode voltage regulation signal is reduced, and the clamping time period of the DPWM modulation wave is reduced, which adversely increases the switch loss. In this embodiment of this disclosure, only the common-mode voltage regulation signal in the non-clamping time period is attenuated, and a relatively small switch loss can still be maintained without changing the clamping time period. In addition, the increase of the ripple current in the busbar capacitor is suppressed.

In an alternative embodiment of this disclosure, the control method 500 of the three-phase multi-level inverter 131 may further include the following. The control apparatus 132 receives a sensed value related to the three-phase multi-level inverter 131, and determines the modulation ratio threshold based on the sensed value. For example, as described in FIG. 6, the modulation ratio threshold corresponds to the modulation ratio at the intersection (or a critical point) of the SPWM curve and the DPWM curve. Studies indicate that the modulation ratio threshold changes under different operating conditions. The modulation ratio threshold is related to various electrical quantities of the inverter. These electrical quantities include, for example, a power factor, a busbar voltage, and a grid-tied alternating-current voltage. Therefore, the control apparatus 132 may obtain these electrical quantities by using a sensing apparatus, and determine the modulation ratio threshold in real time based on the sensed electrical quantity, to implement better DPWM control.

In some embodiments of this disclosure, the control apparatus 132 may receive a sensed value of a power factor of the three-phase multi-level inverter 131, and determine a modulation ratio threshold based on the power factor. For example, the modulation ratio threshold may be determined according to an actual operating condition. There is a strong correlation between the modulation ratio threshold and the power factor. The following table shows an example of a relationship between a power factor and a modulation ratio threshold.

| Power factor | −0.2 | −0.4 | −0.6 | −0.8 | 1 | 0.8 | 0.6 | 0.4 | 0.2 |
|---|---|---|---|---|---|---|---|---|---|
| Modulation ratio threshold | 1.0761 | 1.0629 | 1.0496 | 1.0377 | 1.0286 | 1.0377 | 1.0496 | 1.0629 | 1.0761 |

It can be learned that the modulation ratio threshold is gradually reduced as an increase of an absolute value of the power factor. Due to existence of this strong correlation, the modulation ratio threshold may be determined based on the power factor. When the power factor is obtained, the control apparatus 132 may determine a corresponding modulation ratio threshold through calculation, or may determine a corresponding modulation ratio threshold through querying a table.

In embodiments of this disclosure, the DPWM modulation scheme may be optimized, so that the three-phase multi-level inverter maintains a relatively small switch loss while reducing the ripple current in the busbar capacitor to a greatest extent, thereby improving overall efficiency of the inverter and reducing the costs.

To verify an improvement effect of the present disclosure, a three-phase three-level inverter is used as a test object. An optimization status of a ripple current in a busbar capacitor under various operating conditions is tested by using the method in the present disclosure. The following table shows test data of the ripple current in the busbar capacitor. The test indicates that in the method in this disclosure, the ripple current in the busbar capacitor can obtain an optimization effect of at least 6% to nearly 30%. The test indicates that a higher busbar voltage indicates a better optimization effect. Because the grid-tied alternating-current voltage is basically constant, the higher busbar voltage indicates the smaller modulation ratio of the inverter.

| Operating condition | Busbar voltage (V) | Power-grid voltage (V) | Active power in kilowatts (kW) | Reactive power (kVAR) | Apparent power (kVA) | DP opening |
|---|---|---|---|---|---|---|
| 1 | 835 | 220 | 42.162 | 0 | 42.162 | 1 |
| 2 | 800 | 220 | 42.144 | 0 | 42.144 | 1 |
| 3 | 858 | 220 | 33.723 | −25.331 | 42.177 | 1 |
| 4 | 800 | 220 | 43.987 | 0 | 43.987 | 0.8 |
| 5 | 800 | 220 | 43.991 | 0 | 43.991 | 0.5 |
| 6 | 850 | 220 | 43.99 | 0 | 43.99 | 0.5 |

| Operating condition | Power frequency component (A) | High-frequency component (A) | Total valid value (A) | Unoptimized single capacitor valid value (A) | Optimized single capacitor valid value (A) | Optimization percentage |
|---|---|---|---|---|---|---|
| 1 | 27.029 | 4.457 | 27.36 | 5.472 | 4.994 | 8.74% |
| 2 | 25.743 | 4.457 | 26.58 | 5.316 | 4.98 | 6.32% |
| 3 | 24.886 | 3.886 | 25.65 | 5.13 | 4.32 | 15.79% |
| 4 | 24.6 | 5.171 | 27.15 | 5.43 | 4.954 | 8.77% |
| 5 | 23.029 | 5.743 | 23.87 | 4.774 | 3.922 | 17.85% |
| 6 | 21.886 | 6.457 | 23.1 | 4.62 | 3.358 | 27.32% |

The control apparatus 132 in the inverter device 130 may be implemented in a plurality of manners. In some embodiments of this disclosure, the control apparatus 132 may be, for example, a control device including a processing unit. Alternatively, the control apparatus 132 may be any other device that has calculation and control functions. For example, the control apparatus 132 may include circuit forms of an analog circuit and a digital circuit.

Figure 11:
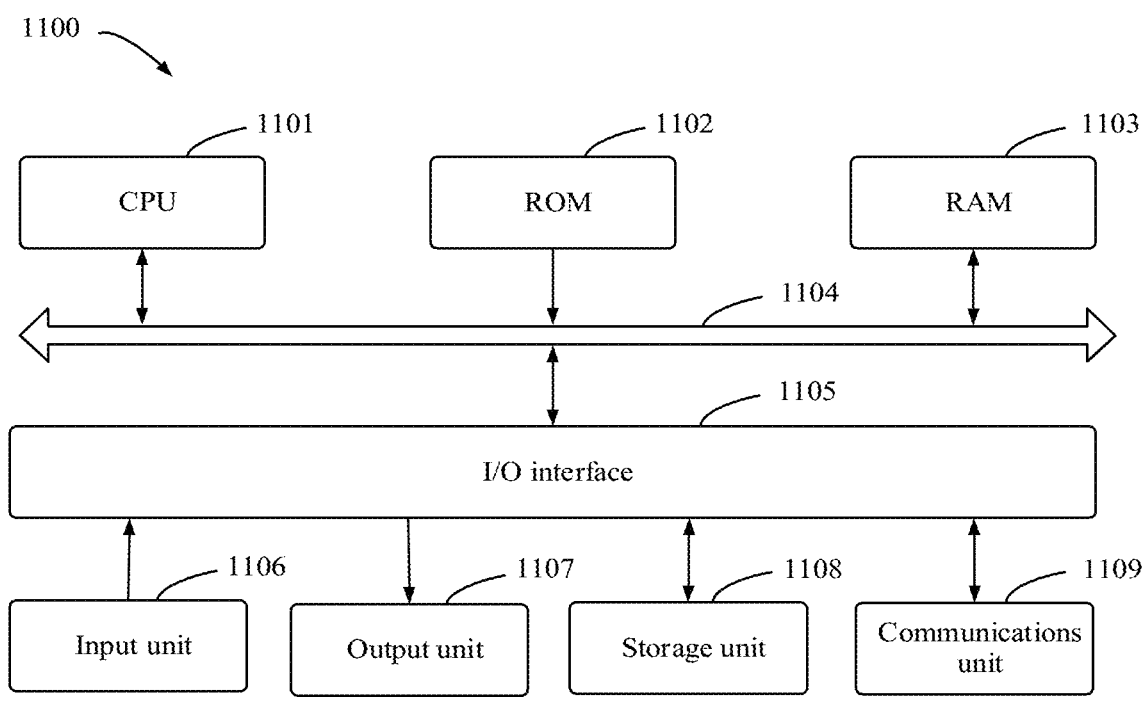
FIG. 11 is a schematic block diagram of an example device that may be used to implement some embodiments of this disclosure.

FIG. 11 is a schematic block diagram of an example device 1100 that may be used to implement some embodiments of this disclosure. The device 1100 may be configured to implement the control apparatus 132 in FIG. 4B. As shown in FIG. 11, the device 1100 includes a computing unit 1101. The device 1100 may perform various proper operations and processes based on computer program instructions stored in a random-access memory (RAM) and/or a read-only memory (ROM) 1102 or computer program instructions loaded from a storage unit 1107 to the RAM and/or the ROM 1102. The RAM and/or the ROM 1102 may further store various programs and data required for operations of the device 1100. The computing unit 1101 is connected to the RAM and/or the ROM 1102 by using a bus 1103. An input/output (I/O) interface 1104 is also connected to the bus 1103.

A plurality of components in the device 1100 are connected to the I/O interface 1104. The components include an input unit 1105 such as a keyboard or a mouse, an output unit 1106 such as various types of displays or speakers, a storage unit 1107 such as a magnetic disk or a compact disc, and a communications unit 1108 such as a network adapter, a modem, or a wireless communications transceiver. The communications unit 1108 allows the device 1100 to exchange information/data with another device over a computer network such as the Internet and/or various telecommunication networks.

The computing unit 1101 may be various general-purpose and/or dedicated processing components that have processing and computing capabilities. Some examples of the computing unit 1101 include but are not limited to a central processing unit (CPU), a graphics processing unit (GPU), various dedicated artificial intelligence (AI) computing chips, various computing units running a machine learning model algorithm, a digital signal processor (DSP), and any proper processor, controller, microcontroller. The computing unit 1101 performs various methods and processes described above, for example, the method 500. For example, in some embodiments, the method 500 may be implemented as a computer software program. The computer software program is embodied in a machine readable medium, for example, a storage unit 1107. In some embodiments, a part or all of the computer program may be loaded to and/or installed on the device 1100 by using the RAM and/or the ROM and/or the communications unit 1108. When the computer program is loaded to the RAM and/or the ROM and executed by the computing unit 1101, one or more steps of the method 500 described above may be performed. Alternatively, in other embodiments, the computing unit 1101 may be configured to perform the method 500 in any other proper manner (for example, by using firmware).

Program code for implementing the method in this disclosure may be written in any combination of one or more programming languages. The program code may be provided to a processor or a controller of a general-purpose computer, a dedicated computer, or another programmable data processing apparatus, so that the program code is executed by the processor or the controller to implement the functions/operations specified in the flowchart and/or the block diagram. The program code may be executed fully on a machine, partly on a machine, partly on a machine as an independent software package and partly on a remote machine, or fully on a remote machine or server.

In this specification of this disclosure, a machine-readable medium may be a physical medium. The medium may include or store programs for an instruction execution system, apparatus, or device to use, or for a combination of an instruction execution system, apparatus, or device to use. The machine-readable medium may be a machine-readable signal medium or a machine-readable storage medium. The machine-readable medium may include but is not limited to an electronic, a magnetic, an optical, an electromagnetic, an infrared, or a semiconductor system, apparatus, or device, or any proper combination of the foregoing content. A more specific example of the machine-readable storage medium includes an electrical connection based on one or more lines, a portable computer disk, a hard disk, a RAM, a ROM, an erasable programmable PROM (EPROM or flash memory), an optical fiber, a convenient compact disk read-only memory (CD-ROM), an optical storage device, a magnetic storage device, or any proper combination of the foregoing content.

In addition, although operations are described in a particular order, this should be understood as a requirement for performing the operations in the shown particular order or in a sequence, or a requirement for performing all operations shown in the diagrams to achieve an expected result. In a specific environment, multi-task and parallel processing may be advantageous. Similarly, although several specific implementation details are included in the foregoing descriptions, these should not be construed as limitation on a scope of this disclosure. Certain features described in context of independent embodiments may also be implemented in combination in a single implementation. Instead, the various features described in the context of the single implementation may also be implemented in a plurality of implementations individually or in any proper sub-combination.

Although this subject has been described in a language specific to structural features and/or methodological acts, it should be understood that this subject defined in the appended claims is not necessarily limited to the specific features or acts described above. The specific features and acts described above are merely example forms of the claims.

What is claimed is:

1. A control method of a three-phase multi-level inverter, comprising:
   determining, based on an output of the three-phase multi-level inverter, a modulation ratio of a first amplitude value of a sinusoidal modulation wave in pulse-width modulation to a second amplitude value of a carrier;
   generating, when the modulation ratio is not less than a modulation ratio threshold, a common-mode voltage regulation signal in a first mode, wherein the common-mode voltage regulation signal is for regulating a common-mode voltage in phase voltages of the three-phase multi-level inverter;
   generating the common-mode voltage regulation signal in a second mode when the modulation ratio is less than the modulation ratio threshold, wherein the common-mode voltage in the second mode is reduced during a part of a time period in comparison with the common-mode voltage in the first mode;
   adding the common-mode voltage regulation signal and a differential-mode voltage regulation signal for regulating a differential-mode voltage in the phase voltages to obtain a composite regulation signal;
   implementing the composite regulation signal as a modulation wave for discontinuous pulse-width modulation (DPWM); and
   generating, based on the composite regulation signal, drive signals to control switches of phases of the three-phase multi-level inverter.

2. The control method of claim 1, further comprising:
   receiving a sensed value related to the three-phase multi-level inverter; and
   determining, based on the sensed value, the modulation ratio threshold.

3. The control method of claim 2, wherein the sensed value comprises a power factor of the three-phase multi-level inverter, and wherein determining the modulation ratio threshold further comprises further determining, based on the power factor, the modulation ratio threshold.

4. The control method of claim 1, wherein generating the common-mode voltage regulation signal in the second mode when the modulation ratio is less than the modulation ratio threshold comprises generating the common-mode voltage regulation signal in a common-mode voltage reduction manner during a non-clamping time period in comparison with the first mode, and wherein the common-mode voltage reduction manner during the non-clamping time period uses DPWM and has a switch operation.

5. The control method of claim 4, wherein generating the common-mode voltage regulation signal in the common-mode voltage reduction manner comprises generating the common-mode voltage regulation signal to set the common-mode voltage to zero during the non-clamping time period.

6. The control method of claim 4, wherein generating the common-mode voltage regulation signal in the common-mode voltage reduction manner comprises generating the common-mode voltage regulation signal to set the common-mode voltage to a graded step voltage during the non-clamping time period, wherein the graded step voltage gradually changes from a first voltage value to zero and gradually changes from zero to a second voltage value with time, and wherein the first voltage value is different from the second voltage value.

7. An inverter system comprising:
   a three-phase multi-level inverter comprising switches and configured to output an output electrical quantity, wherein the output electrical quantity comprises an output voltage of the three-phase multi-level inverter and an output current of the three-phase multi-level inverter; and
   a control apparatus coupled to the three-phase multi-level inverter and configured to:
      determine, based on the output electrical quantity, a modulation ratio of an amplitude value of a sinusoidal modulation wave in pulse width modulation to an amplitude value of a carrier;
      receive a sensed value related to the three-phase multi-level inverter, wherein the sensed value comprises a power factor of the three-phase multi-level inverter;
      determine, based on the power factor, a modulation ratio threshold;
      generate, based on the modulation ratio and the modulation ratio threshold, a common-mode voltage regulation signal for regulating a common-mode voltage in phase voltages of the three-phase multi-level inverter;
      add the common-mode voltage regulation signal and a differential-mode voltage regulation signal for regulating a differential-mode voltage in the phase voltages to obtain a composite regulation signal;
      implementing the composite regulation signal as a modulation wave for discontinuous pulse width modulation (DPWM); and
      generate, based on the composite regulation signal, drive signals to control the switches of the three-phase multi-level inverter.

8. The inverter system of claim 7, wherein generating, based on the modulation ratio and the modulation ratio threshold, the common-mode voltage regulation signal comprises:
generating the common-mode voltage regulation signal in a first mode when the modulation ratio is not less than the modulation ratio threshold; and
generating the common-mode voltage regulation signal in a second mode when the modulation ratio is less than the modulation ratio threshold, wherein the common-mode voltage in the second mode is reduced during a part of a time period in comparison with the common-mode voltage in the first mode.

9. The inverter system of claim 8, wherein generating the common-mode voltage regulation signal in the second mode when the modulation ratio is less than the modulation ratio threshold comprises generating the common-mode voltage regulation signal in a common-mode voltage reduction manner during a non-clamping time period in comparison with the first mode, and wherein the common-mode voltage reduction manner during the non-clamping time period uses DPWM and has a switch operation.

10. The inverter system of claim 9, wherein generating the common-mode voltage regulation signal in the common-mode voltage reduction manner in the non-clamping time period in comparison with the first mode comprises generating the common-mode voltage regulation signal to set the common-mode voltage to zero during the non-clamping time period.

11. The inverter system of claim 9, wherein generating the common-mode voltage regulation signal in the common-mode voltage reduction manner in the non-clamping time period in comparison with the first mode comprises generating the common-mode voltage regulation signal to set the common-mode voltage to a graded step voltage during the non-clamping time period, wherein the graded step voltage gradually changes from a first voltage value to zero and gradually changes from zero to a second voltage value with time, and wherein the first voltage value is different from the second voltage value.

12. A power generation system comprising:
a photovoltaic system configured to output a first direct current (DC) voltage;
a converter device coupled to the photovoltaic system and configured to:
  receive the first DC voltage;
  convert the first DC voltage to a second DC voltage; and
  output the second DC voltage;
an inverter system coupled to the converter device and comprising:
  a three-phase multi-level inverter comprising switches and configured to:
    receive the second DC voltage;
    convert the second DC voltage to an output electrical quantity; and
    output the output electrical quantity, wherein the output electrical quantity comprises an output voltage of the three-phase multi-level inverter and an output current of the three-phase multi-level inverter; and
  a control apparatus coupled to the three-phase multi-level inverter and configured to:
    determine, based on the output electrical quantity, a modulation ratio of a first amplitude value of a sinusoidal modulation wave in pulse width modulation to a second amplitude value of a carrier;
    generate, when the modulation ratio is not less than a modulation ratio threshold, a common-mode voltage regulation signal in a first mode, wherein the common-mode voltage regulation signal is for regulating a common-mode voltage in phase voltages of the three-phase multi-level inverter;
    generate the common-mode voltage regulation signal in a second mode when the modulation ratio is less than the modulation ratio threshold, wherein the common-mode voltage in the second mode is reduced during a part of a time period in comparison with the common-mode voltage in the first mode;
    add the common-mode voltage regulation signal and a differential-mode voltage regulation signal for regulating a differential-mode voltage in the phase voltages to obtain a composite regulation signal;
    implementing the composite regulation signal as a modulation wave for discontinuous pulse width modulation (DPWM); and
    generate, based on the composite regulation signal, drive signals to control the switches; and
a transformer coupled to the inverter system and configured to:
  receive the output electrical quantity;
  convert the output voltage of the output electrical quantity to a power grid voltage; and
  output the power grid voltage.

13. The power generation system of claim 12, wherein the control apparatus is further configured to:
receive a sensed value related to the three-phase multi-level inverter; and
determine, based on the sensed value, the modulation ratio threshold.

14. The power generation system of claim 13, wherein the sensed value comprises a power factor of the three-phase multi-level inverter, and wherein the control apparatus is further configured to determine, based on the power factor, the modulation ratio threshold.

15. The power generation system of claim 12, wherein the control apparatus is further configured to generate the common-mode voltage regulation signal in a common-mode voltage reduction manner during a non-clamping time period in comparison with the first mode, and wherein the common-mode voltage reduction manner during the non-clamping time period uses DPWM and has a switch operation.

16. The power generation system of claim 15, wherein the control apparatus is further configured to generate the common-mode voltage regulation signal to set the common-mode voltage to zero during the non-clamping time period.

17. The power generation system of claim 15, wherein the control apparatus is further configured to generate the common-mode voltage regulation signal to set the common-mode voltage to a graded step voltage during the non-clamping time period, wherein the graded step voltage gradually changes from a first voltage value to zero and gradually changes from zero to a second voltage value with time, and wherein the first voltage value is different from the second voltage value.

* * * * *